Figure 1:
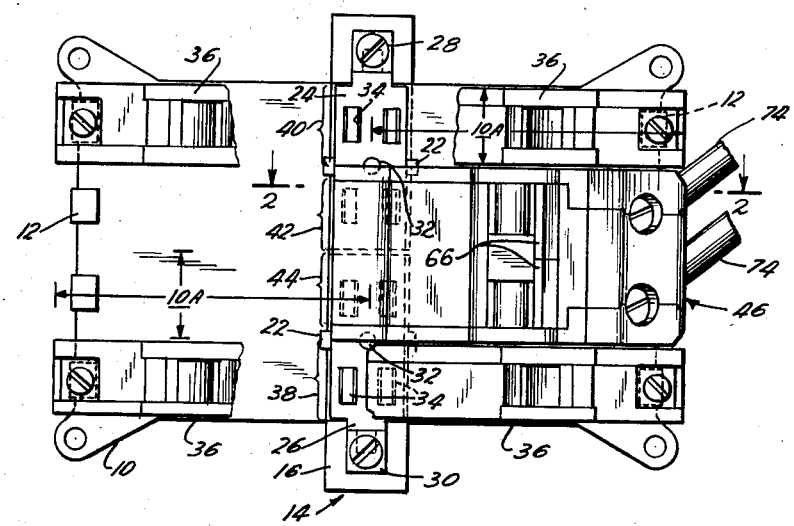

Feb. 4, 1964  A. R. NORDEN  3,120,592
CIRCUIT BREAKERS FOR PANELBOARDS
Filed Feb. 26, 1958

INVENTOR
ALEXANDER R. NORDEN
BY
ATTORNEY

United States Patent Office 3,120,592
Patented Feb. 4, 1964

3,120,592
CIRCUIT BREAKERS FOR PANELBOARDS
Alexander R. Norden, New York, N.Y., assignor to Federal Pacific Electric Company, a corporation of Delaware
Filed Feb. 26, 1958, Ser. No. 717,647
4 Claims. (Cl. 200—116)

The present invention relates to circuit breakers, especially for mounting on standard circuit breaker panelboards.

Circuit breaker panelboards, particularly the plug-in type such as that of the type disclosed in U.S. Patent 2,647,225, issued July 28, 1953 to T. M. Cole et al., have gained great popularity and are in widespread use. This success in part may be attributed to the fact that both the panelboard and the circuit breakers are manufactured as standard items, the circuit breakers being supplied in a variety of ratings (to a maximum) to be selected and mounted on the panelboard as required by each particular installation and without requiring any individual attention by the manufacturer to the particular job. The standardized circuit breakers for each manufacturer's panelboard have the same physical proportions (per pole) regardless of rating, up to a maximum, and the panelboard is designed to operate according to established safety standards when fully equipped with the standard circuit breakers.

An object of the present invention is to provide a novel form of circuit breaker having a heavier per-pole current rating than the maximum standard circuit breakers available for use with the standardized panelboards, without however interfering with the versatility or flexibility of the standardized panelboards or with their meeting established standards. Previous standard circuit breakers and the novel circuit breakers can be used in accordance with job requirements without any special attention by the manufacturer to each job requirement.

Panelboards for circuit breakers are commonly designed to be energized from different phases of an alternating current supply. Where center-tapped single phase service is furnished, the center tap is arranged as a neutral and the two outside wires of the supply are referred to as "phases"; and this term is also used to designate the separate supply lines of a three-phase power supply for which other standard panelboards are designed. Both single-phase and three-phase panelboards are "sequence-phased," that is, the bus terminals of both classes of panelboards are subdivided, adjacent portions of the subdivided bus terminal assembly being adapted for connection to the different phases of the supply. The adjacent poles of multiple circuit breakers mounted at a subdivision of the bus can then be energized by different phases of the supply. According to a further feature of the invention, a novel multipole circuit breaker is provided for mounting on a standard sequence-phased panelboard where the rating of the individual poles of the multipole circuit breaker is heavier than the maximum safe standard individual pole rating for which the panelboard is intended, while at the same time insuring approved operation of the panelboard according to established standards.

Figure 2:
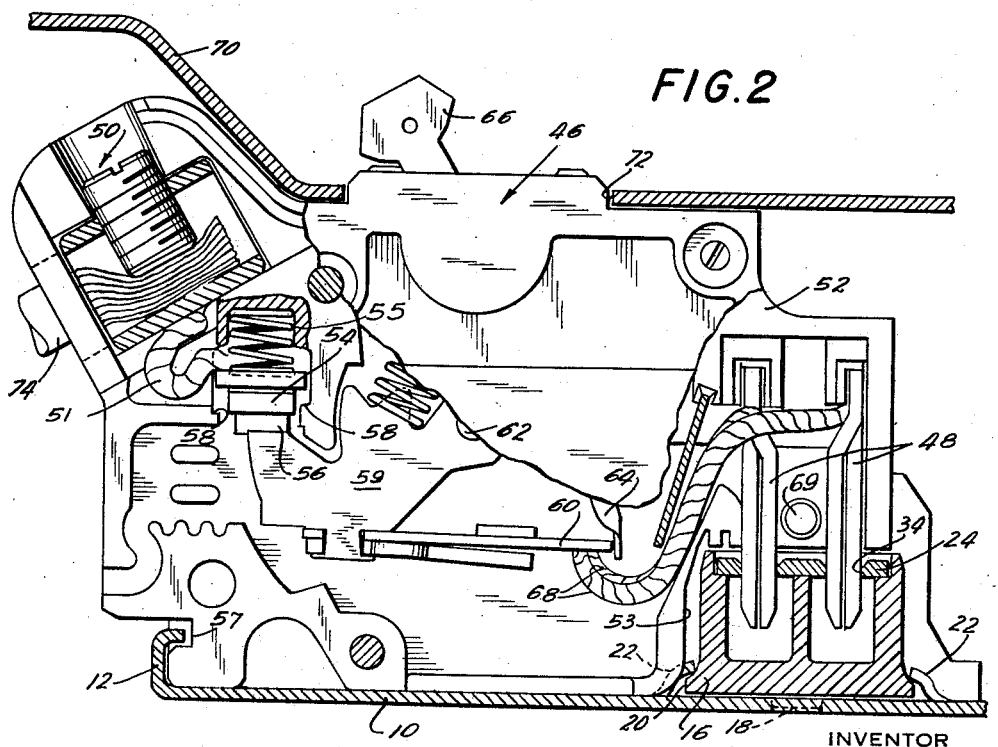

The nature of the invention and further features of novelty and other aspects of the invention will be better appreciated from the following detailed description of an illustrative embodiment thereof, shown in the accompanying drawings forming part of the disclosure of the invention. In the drawings:

FIG. 1 is the plan view of a circuit breaker panelboard of standard design, bearing circuit breakers of standard design together with an illustrative form of a two-pole circuit breaker embodying features of the present invention; and FIG. 2 is an enlarged cross-section of the apparatus in FIG. 1 taken along the line 2—2.

A panel assembly is shown in FIGURES 1 and 2 of the type in the aforementioned Cole et al. patent. This panel-board is of a form to receive two rows of single pole circuit breakers with four single-pole circuit breakers in each row; or, alternatively, the standard panelboard is adapted to receive one two-pole circuit breaker in each row and, additionally, two single pole circuit breakers in each row. Two-pole circuit breakers suitable for use here may be of the type in the Christensen et al. Patent 2,662,949 issued December 15, 1953. Two-pole circuit breakers are characterized by having two circuits that are entirely electrically separate and which are commonly designated "poles." Each pole includes a line terminal, a load terminal, a pair of contacts which are closed and opened to make and break the circuit from the supply terminal to the load terminal, and an overload release element. The poles of a two-pole circuit breaker have a common operating handle and each pole may have its separate operating mechanism, or a single contact-operating mechanism may be provided for all of the poles. The overload release means of each pole in any case causes automatic opening of the contacts of the several poles upon detection of an overload in any one pole. While the discussion of poles above refers to single- and two-pole circuit breakers, it is fully applicable to three-pole circuit breakers.

The panelboard in FIGS. 1 and 2 is designed for the usual three-wire single phase power distribution system. A three-phase sequence-bussed panelboard such as that in my Patent No. 2,739,272 issued March 20, 1956 will naturally be used with the three-pole circuit breaker.

The illustrative panelboard for receiving the circuit breakers includes a terminal pan assembly comprising a mounting pan 10 having a series of integral hooks 12 at the lateral edges as viewed in FIG. 1. A terminal assembly generally designated 14 includes a member 16 of molded insulation having a downward projection 18 that fits into a corresponding hole in pan 10 and lateral projections 20 that are engaged by overhanging lances 22 integral with pan 10. Lances 22 prevent the molded member 16 from being lifted away from the pan, and projection 18 of member 16 prevents the molded member from sliding lengthwise out of engagement with retaining lances 22.

Insulating member 16 supports a pair of terminal members 24 and 26, which are designed to be connected as by screw connectors 28 and 30 to the two outside legs or phases of a three-wire single phase alternating current power line. Terminal members 24 and 26 are secured to insulating member 16 by screws 32 that extend from the bottom of the molded member 16 up into respective threaded openings in the members 24 and 26. Further, each terminal member 24 and 26 includes a series of formations 34 which constitute individual bus terminal formations complementary to the individual terminals of the circuit breakers mounted by the mounting pan and terminal assembly. In the embodiment shown in the drawings, the formations 34 are in the form of slots which receive male plug-in terminals of the illustrative circuit breakers; but in another widely used form of plug-in circuit breaker, the terminal formations of the panelboard are male members or blades that are complementary to resilient metal clips constituting the plug-in terminals of the circuit breakers. Such male panelboard terminal formations or blades may be disposed in the same direction as the slots 34 or they may extend across the terminal assembly 14, at right angles to the shown elongated slots 34 that they would replace.

One retaining hook 12 and one formation 34 are provided for cooperating with each pole of the circuit breakers mounted by the mounting pan and terminal assembly shown. In the illustration, pan 10 provides two rows of circuit breaker receiving areas 10A at opposite sides of the terminal assembly 14, four such areas being shown on each side of the terminal assembly.

A pair of single-pole circuit breakers 36 appear in the bottom areas 10A in the two rows of circuit breaker receiving areas. The terminal formations 34 that cooperate with the male plug-in terminals (not shown) of those bottom two circuit breakers 36 are both in one portion 38 of the terminal member 36, inasmuch as the bottom two circuit breakers 36 are properly connected to the same phase. A pair of terminal formations 34 are similarly available for mating with the plug-in terminals of the top pair of circuit breakers 36 in FIG. 1 at opposite sides of the terminal assembly 14. Terminal members 24 and 26 embody additional portions 42 and 44 respectively for respective poles of circuit breakers at opposite sides of the terminal assembly 14.

Terminal portions 42 and 44 are of different phases, and they are adjacent each other, so that a two-pole circuit breaker having a pair of stab plug-in terminals, of the form in the Christensen et al. patent mentioned above, can be mounted in either the left-hand row or the right-hand row of areas 10A of the mounting pan; and each of the poles of the two-pole circuit breaker thus mounted would be connected to respectively different phases. At this point, the terminals of the panelboard are said to be sequence-phased. It is evident that the terminals provided by the terminal assembly 14 could be 100% sequence-phased, by connecting areas 40, 42, 44 and 38 to the alternate supply phases, and in that event a two-pole circuit breaker of conventional form could be mounted at any point on the panelboard. However, it is apparent that whether the limited sequence-phasing of the bus terminals 24 and 26 as illustrated is employed or whether 100% sequence phasing of the terminal portions 38, 40, 42 and 44 is used, the terminal formations 34 associated with each opposite pair of poles 36 in two rows of areas 10A are connected to the same phase. A 100% sequence-phased panelboard construction is shown in my patent mentioned above. That panelboard has two rows of circuit breaker receiving areas 10A, and there as here the pairs of opposite poles (one pole in each row) are connected to the same phase bus.

The load or current capacity for which the panelboard and terminal assembly of FIG. 1 may be rated depends to a large extent on the current carrying capacity of the bus terminals provided. Correspondingly, the bus terminals must be of sufficient capacity to accommodate the full complement of circuit breakers 36, within the standard range of ratings of circuit breakers of that outline. Thus, the terminal assembly illustrated as well as the entire mounting pan and terminal assembly illustrated may be rated for 100 amperes to accommodate a typical complement of circuit breakers 36 whose ratings may be any combination of values between 15 and 50 amperes.

In accordance with features of the present invention, circuit breakers 46 are provided for heavy currents having enclosures proportioned to be mounted on the standard mounting pan assembly illustrated, without however exceeding the rating of the panelboard. The novel two-pole circuit breaker illustrated includes one pair of male or stab terminals 48 of one pole thereof that mate with portion 42 of terminal member 24, and a similar pair of stab terminals 48 are provided for the other pole of the circuit breaker, to mate with terminal portion 44 of the bus assembly. In this way, the standard panelboard can receive a two-pole circuit breaker at one side of the terminal assembly 14, in the space provided for two single poles; and this circuit breaker may be rated at 100 amperes, for example, without danger of overloading the panelboard. The heavy-current circuit breaker 46 engages not only the terminal formations 34 associated with the circuit breaker receiving areas 10A in the row which it occupies but also the terminal formations 34 associated with the circuit breaker receiving areas 10A in the other row, at the opposite side of the terminal assembly 14. Each pole of the novel circuit breaker 46 with its dual plug-in terminal fully occupies an area 10A and additionally preempts part of the opposite circuit breaker receiving area 10A of the opposite row of circuit breaker receiving areas 10A. This prevents mounting of a circuit breaker or a pair of circuit breaker poles in those areas 10A in the row opposite that where the circuit breaker has been mounted. It is evident also that the dual circuit breaker plug-in terminal 48 has proportionately greater contact surface engaging the terminal 14, and twice the current-carrying capacity of a single circuit breaker stab that engages a single slot 34, and the multiple circuit breaker retains the side-by-side arrangement of coordinated poles and may be mounted to engage the respectively different phases of the panelboard bus assembly.

One of the poles of circuit breaker 36 is shown in FIG. 2 in broken-away cross-section. In that view, a screw connector 50 is shown at the end of the enclosure 52 of molded insulation remote from dual terminal 48; and this screw terminal 50 is joined by metal braid 51 to a resiliently mounted contact 54. Spring 55 biases contact 54 downward in the illustration. When the companion movable contact 56 is removed, the travel of the contact 54 is limited by shoulders 58 formed integrally in the molded enclosure 52.

Contact 56 is carried by a movable arm 59 as of copper to which there is united a current responsive bimetal 60. Contact arm 59 is pivoted on a rigid pin 62 journaled in the casing. Contact arm 59 is operated by a linkage including latch 64 and other elements not here shown, but which are, for example, of the form in the above-mentioned patent to Christensen et al., extending to the operating handle 66. Bimetal 60 is connected by two flexible lengths of metal braid 68 to the respective stabs of the dual plug-in terminal 48. These metal stabs each have lateral formations that are loosely complementary to formations in the molded insulating enclosure 52 and are accordingly movable flexibly in relation to each other. A rod of insulation 69 projects integrally from the wall of enclosure 52 to space stabs 48 and promote alignment with respective slots 34. In this way, each stab can shift individually into proper plug-in contact engagement with terminal member 24 (FIG. 2).

A further feature contributing to the successful heavy current operation of the disclosed circuit breaker which is basically of the same small enclosure outline as the previous circuit breakers resides in the mounting of contact 54 in relation to the companion contact 56 and its operating means. The operating linkage for contact arm 59 is made up of rigid elements, so that pressure of contact 56 against contact 54 is built up against spring 55.

As the moving contact 56 swings down in the drawing, contact 54 follows under firm spring bias. Its travel is interrupted by shoulders 58. Inasmuch as shoulder 58 at the right is higher than the other shoulder, the right-hand edge of the contacts part first, the spring maintaining the left-hand portion of contact 54 in engagement with contact 56. The parting of the contacts then starts arcing at the left, and the arc blows out toward the left, all of which acts to minimize the damage to the contacts resulting from opening the contacts under load and particularly when carrying short-circuit current.

Closing of the contacts operates in reverse, the initial contact first occurring at the left-hand portion of the contacts and then shifting by a rocking or tilting of contact 54 until face contact is made. This action insures that that portion of the contact surfaces that have been least abused in the contact-making and breaking operations will carry the operating current, resulting in cooler operation and lower contact resistance.

Each pole of the circuit breaker 46 includes the elements shown in FIG. 2. Inasmuch as the mechanism causing two-pole operation, that is, simultaneous opening of the contacts in response to a single-pole overload, forms no part of the present invention, little purpose apparently would be served by burdening the present specification with further details thereof. A single operating handle 66 for the coordinated side-by-side poles is shown in FIG. 1.

Circuit breaker panelboards normally include a trim plate which covers up the wiring and presents a neat finished appearance of the entire assembly. Trim plate 70 of standard design as shown in FIG. 2 has a hole 72 formed therein for accommodating the handle 66 of the circuit breaker 46, together with a protruding portion of the circuit breaker enclosure 52 that surrounds the operating handle. Trim plate 70 normally has a series of knockouts formed in the various places where the circuit breakers may project. However, inasmuch as the panelboard may be only partly filled with circuit breakers, these knockouts are left intact as parts of the trim plate in those areas where circuit breakers are not installed. In the case of the circuit breaker illustrated, which preempts the terminal portions 34 associated with both the right-hand and the left-hand rows of circuit breaker receiving areas 10A, as shown in FIG. 1, the knockouts in trim plate 70 (at the right-hand side of the trim plate as viewed in FIG. 2) are left intact. The trim plate thus covers the areas 10A which are necessarily left empty because of the special construction of circuit breaker 46 which prevents additional circuit breakers from being received therein.

The circuit breaker enclosures 52 have a relief or cutout 53 in their otherwise generally rectangular outline, which accommodates the terminal bus assembly 14 while at the same time allowing the circuit breaker enclosures 52 to rest flush against the mounting pan 10.

When a circuit breaker is to be installed, the circuit breaker is moved into engagement with one of the hooks 12 fitting into a recess 57 in the enclosure 52, the parts 12 and 57 functioning as a separable hinge to locate the circuit breaker both right-to-left in FIG. 2 and perpendicular to the view, so that the stabs 48 can be driven directly into slots 34. Trim plate 70 is assembled to the position in FIG. 2 after all the required circuit breakers have been mounted.

The circuit breaker 46 may obviously be used to energize a branch circuit which is thereby protected by the circuit breaker. However, particularly in panelboards having space for receiving a larger number of circuit breaker poles, the wires 74 shown connected to the screw terminals 50 of circuit breaker 46 might very well be the power supply line, circuit breaker 46 then serving as a main circuit breaker with the remainder of the circuit breakers on the panelboard then serving for branch-circuit protection.

While the embodiment illustrated and described above represents the presently preferred form of the invention, it is evident that it is naturally subject to a wide variety of modification in detail as well as varied application. Consequently the invention should be broadly construed, consistent with its full spirit and scope.

What is claimed is:

1. A circuit breaker for mounting on a standardized panelboard of the type having two confronting rows of modular circuit-breaker receiving areas and an elongated sequence-phased bus terminal assembly between said two rows of areas, each modular circuit-breaker receiving area being elongated and extending perpendicular to the elongated bus terminal assembly and the bus terminal assembly including individual bus terminals that are sequence-phased along the bus assembly, each such circuit breaker receiving area having an individual bus terminal adapted for engagement with the bus terminal of a pole of a circuit breaker mounted therein, said circuit breaker having an elongated pole to occupy one of said circuit breaker receiving areas and including an enclosure having bus terminal means at one end thereof, a pair of separable contacts, one of said contacts being connected to said bus terminal means, and an overload responsive element, connected to one of said contacts, the bus terminal means of said elongated pole including one discrete terminal formation disposed for engagement with the bus terminal of said one circuit breaker receiving area and said bus terminal means of said pole having an additional discrete terminal formation solidly connected to said one discrete terminal formation and displaced from said one discrete terminal formation along the elongated pole and disposed to occupy and engage the individual bus terminal corresponding to the confronting circuit breaker receiving area in the other row of such areas and thereby to prevent mounting of another circuit breaker in that confronting circuit breaker receiving area.

2. A multiple circuit breaker for plug-in mounting on a standardized panelboard of the type having two confronting rows of elongated modular areas for mounting single-pole and multipole circuit breakers side-by-side and having an elongated sequence-phased bus assembly between said two rows of modular areas, the sequence-phased type of bus assembly having a bus terminal in each modular area cooperable with an individual circuit-breaker terminal formation and the bus terminals being sequence-phased along the bus assembly, said multipole circuit breaker having a pair of side-by-side elongated poles to occupy two side-by-side modular circuit-breaker receiving areas of one row of panelboard areas, each pole of the multipole circuit breaker having a pair of separable contacts, an overload responsive element connected to one of said contacts and bus terminal contact means connected to one of said contacts, the latter including one discrete terminal formation disposed for engagement with the bus terminal of one modular circuit-breaker receiving area and said bus terminal contact means of each pole of the circuit breaker having an additional discrete terminal formation solidly connected to said one discrete contact portion and displaced from said one terminal formation along the elongated pole and disposed to occupy and engage the bus terminal of the confronting circuit-breaker receiving area in the other row of such modular panelboard areas and thereby to prevent mounting of another circuit breaker in that confronting circuit breaker receiving area.

3. A circuit breaker in accordance with claim 2 for mounting on a standardized panelboard as aforesaid in which the individual bus terminals are of the plug-in type, further characterized in that said discrete terminal formations of the circuit breaker are plug-in terminals cooperable with the individual bus terminals of the bus terminal assembly of the panelboard.

4. A circuit breaker in accordance with claim 2 for mounting on a standardized panelboard as aforesaid in which the individual bus terminals are of the plug-in type, further characterized in that said one discrete terminal formation and said additional discrete terminal formation are of the plug-in type, and wherein all of said one discrete terminal formations of the multipole circuit breaker are aligned transverse to said side-by-side elongated poles and all of said additional discrete terminal formations of the multipole circuit breaker are aligned transverse to said side-by-side elongated poles.

References Cited in the file of this patent

UNITED STATES PATENTS

| | | |
|---|---|---|
| 2,647,187 | Cole | July 28, 1953 |
| 2,647,225 | Cole et al. | July 28, 1953 |
| 2,712,580 | Nickell et al. | July 5, 1955 |
| 2,810,048 | Christensen | Oct. 15, 1957 |
| 2,815,420 | Moyer | Dec. 3, 1957 |
| 2,828,388 | Christensen et al. | Mar. 25, 1958 |
| 2,883,586 | Christensen | Apr. 21, 1959 |
| 2,923,795 | Martin | Feb. 2, 1960 |
| 2,942,157 | Davis | June 21, 1960 |
| 2,997,628 | St. John | Aug. 28, 1961 |